United States Patent
Kaneko et al.

(10) Patent No.: US 8,285,929 B2
(45) Date of Patent: Oct. 9, 2012

(54) MANAGEMENT COMPUTER

(75) Inventors: Satoshi Kaneko, Yokohama (JP);
Yukinori Sakashita, Sagamihara (JP);
Daisuke Shinohara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 543 days.

(21) Appl. No.: 12/611,540

(22) Filed: Nov. 3, 2009

(65) Prior Publication Data
US 2011/0060878 A1 Mar. 10, 2011

(30) Foreign Application Priority Data
Sep. 10, 2009 (JP) ................. 2009-208824

(51) Int. Cl.
*G06F 12/00* (2006.01)
*G06F 12/02* (2006.01)
(52) U.S. Cl. ............. 711/114; 711/170; 711/E12.001; 711/E12.002
(58) Field of Classification Search .............. None
See application file for complete search history.

(56) References Cited

U.S. PATENT DOCUMENTS

| 7,051,121 | B2 | 5/2006 | Ohno et al. | |
|---|---|---|---|---|
| 7,096,315 | B2 | 8/2006 | Takeda et al. | |
| 7,127,555 | B2 | 10/2006 | Takeda et al. | |
| 7,209,986 | B2 | 4/2007 | Ohno et al. | |
| 2005/0097243 | A1* | 5/2005 | Yamashita et al. | 710/38 |
| 2006/0112219 | A1* | 5/2006 | Chawla et al. | 711/114 |
| 2008/0098110 | A1 | 4/2008 | Takeda et al. | |
| 2009/0049241 | A1 | 2/2009 | Ohno et al. | |
| 2011/0016273 | A1* | 1/2011 | Kusama et al. | 711/114 |

FOREIGN PATENT DOCUMENTS

| JP | 2004-005370 A | 1/2004 |
|---|---|---|
| JP | 2005-062941 A | 3/2005 |

* cited by examiner

*Primary Examiner* — Denise Tran
(74) *Attorney, Agent, or Firm* — Foley & Lardner LLP

(57) ABSTRACT

The management computer allocates a volume of an external storage device to a host so as to satisfy performance requirements specified from the host. The management computer selects a path that is formed including a first port of the storage device and a second port of the external storage device and that satisfies the performance requirements from the host, and then sets the priority. The management computer sets to the host the use authorization of a primary port and a secondary port that constitute a selected path and the use authorization of a second logical volume.

13 Claims, 15 Drawing Sheets

FIG. 6

| STORAGE NAME (T250) | LUN (T260) | POOL ID (T270) | CAPACITY (T280) | HOST ALLOCATION FLAG (T290) |
|---|---|---|---|---|
| Str_1 | 00 | n/a | 500GB | 1 |
|  | 01 | 00 | 200GB | 1 |
| Str_2 | 00 | 00 | 500GB | 1 |
|  | 01 | 00 | 300GB | 0 |
|  | 02 | 00 | 200GB | 0 |

| STORAGE NAME (T300) | LUN (T310) | EXTERNAL STORAGE NAME (T320) | EXTERNAL LUN (T330) |
|---|---|---|---|
| Str_1 | 00 | Str_2 | 00 |

| STORAGE NAME (T400) | PORT ID (T410) | ATTRIBUTE (T420) | USE FLAG (T430) |
|---|---|---|---|
| Str_1 | 00.00.00.00.00.00.00.00 | Target | 1 |
| | 00.00.00.00.00.00.00.01 | Initiator | 1 |
| | 00.00.00.00.00.00.00.02 | Target | 0 |
| Str_2 | 00.00.00.00.00.00.00.03 | Target | 1 |
| | 00.00.00.00.00.00.00.04 | Initiator | 0 |

| STORAGE NAME (T500) | POOL ID (T510) | CAPACITY (T520) | MEASUREMENT TIME (T530) | FREE CAPACITY (T540) |
|---|---|---|---|---|
| Str_1 | 00 | 1TB | 2009/05/01:12:00:01 0000 | 800GB |
| | | | 2009/05/08:12:00:01 0000 | 700GB |
| | | | 2009/05/09:12:00:01 0000 | 700GB |
| | | | 2009/05/10:12:00:01 0000 | 500GB |
| | | | 2009/05/11:12:00:01 0000 | 500GB |
| | | | 2009/05/12:12:00:01 0000 | 500GB |

| STORAGE NAME (T550) | POOL ID (T555) | TIME (T560) | PREDICTED VALUE OF FREE CAPACITY (T565) |
|---|---|---|---|
| Str_1 | 00 | AFTER 1 HOUR | 600GB |
| | | AFTER 3 HOURS | 600GB |
| | | AFTER 1 DAY | 600GB |
| | | AFTER 1 WEEK | 500GB |
| | | AFTER 1 MONTH | 350GB |
| Str_2 | 01 | AFTER 1 HOUR | 600GB |
| | | AFTER 3 HOURS | 600GB |

| STORAGE NAME (T600) | PORT ID (T610) | PORT MAX. IOPS (T620) | MEASUREMENT TIME (T630) | IOPS AT MEASUREMENT TIME (T640) |
|---|---|---|---|---|
| Str_1 | 00.00.00.00.00.00.00.00 | 2.0G | 2009/05/01 :00:00.01 0000 | 1.8G |
| | | | 2009/05/01 :01:00.01 0000 | 1.6G |
| | | | 2009/05/01 :02:00.01 0000 | 1.2G |
| | | | 2009/05/01 :03:00.01 0000 | 1.0G |
| | | | 2009/05/01 :04:00.01 0000 | 1.0G |
| | | | 2009/05/01 :05:00.01 0000 | 1.2G |

| STORAGE NAME | PORT ID | TIME | PREDICTED VALUE OF IOPS |
|---|---|---|---|
| Str_1 | 00.00.00.00.00.00.00.00 | Mon_00:00 | 1.4G |
| | | Mon_12:00 | 0.1G |
| | | Tus_00:00 | 1.4G |
| | | Tus_01:00 | 0.1G |
| | 00.00.00.00.00.00.00.01 | Mon_00:00 | 0.1G |
| | | Mon_01:00 | 0.1G |
| | | Sun_00:00 | 1.5G |
| | | Sun_01:00 | 1.5G |

T670 — STORAGE NAME
T673 — PORT ID
T676 — TIME
T679 — PREDICTED VALUE OF IOPS
3656

FIG. 13

| PATH ID | PRIMARY PORT ID | SECONDARY PORT ID | STATUS |
|---|---|---|---|
| 00 | 00.00.00.00.00.00.00.00 | 00.00.00.00.00.00.00.01 | SAME HOUSING |
| 01 | | 00.00.00.00.00.00.00.02 | SAME HOUSING |
| 02 | | 00.00.00.00.00.00.00.03 | NO PHYSICAL CONNECTION |
| 03 | | 00.00.00.00.00.00.00.04 | CAN BE USED |
| 04 | 00.00.00.00.00.00.00.01 | 00.00.00.00.00.00.00.00 | SAME HOUSING |
| 05 | | 00.00.00.00.00.00.00.02 | SAME HOUSING |
| 06 | | 00.00.00.00.00.00.00.03 | ATTRIBUTE MUST BE CHANGED |
| 07 | | 00.00.00.00.00.00.00.04 | CAN BE USED |

MANAGEMENT COMPUTER

CROSS-REFERENCE TO RELATED APPLICATIONS

This application relates to and claims priority from Japanese Patent Application No. 2009-208824 filed on Sep. 10, 2009, the entire disclosure of which is incorporated herein by reference.

BACKGROUND OF THE INVENTION

1. Field of the Invention

The present invention relates to a storage system that includes a storage device, an external storage device, and a management computer. In particular, the present invention relates to a method of allocating the logical volume of the external storage device to the virtual logical volume of the storage device by the management computer.

2. Description of the Related Art

In recent years the volume of data handled by computer systems has increased dramatically. Also, the management of storage systems storing the data has become more complex.

A storage device provides storage area to a host computer in units referred to as a logical volume. Conventionally, the storage device allocated arbitrary logical volumes within the storage device to the host computer. However, in recent years the storage administrators are demanding storage devices with system configurations capable of increasing the access to data performance.

Therefore Japanese Patent Application Laid-open No. 2005-062941 discloses a method in which the management computer of a storage system reports the I/O performance of the port of the storage system connected to the host computer. By referring to this report, the administrator can identify the storage resource on which the I/O load is concentrated.

Also, conventionally a storage device connected to a host computer allocates physical resources to a logical volume. When the capacity of the physical disk of the storage device is used up, the storage device connects a second storage device to the host computer, and allocates the logical volume of the second storage device to the host computer. However, when connecting the host computer to the second storage device, work is required to physically connect the host computer and the second storage system, and work is required to set the path to the logical volume of the second storage device. Therefore, a method of allocating the logical volume is required that can further reduce the effort required for these operations.

Therefore Japanese Patent Application Laid-open No. 2004-005370 discloses a method of transferring an I/O request from a host received by a first storage device to a second storage device connected to the first storage device.

According to Japanese Patent Application Laid-open No. 2005-062941, in order for the storage device to allocate appropriate physical resources to the logical volume, it is possible to obtain the port performance data of the storage device connected to the host computer, and report the I/O performance of each physical resource.

Also, according to Japanese Patent Application Laid-open No. 2004-005370, it is possible to connect the first storage device and the second storage device, and transfer I/O requests from the host computer to the first storage device to the second storage device.

SUMMARY OF THE INVENTION

However, if the technology disclosed in Japanese Patent Application Laid-open No. 2005-062941 is applied to the technology disclosed in Japanese Patent Application Laid-open No. 2004-005370, there is the problem that it is not possible to determine the port of the first storage device and the port of the second storage device (the external storage device) that are used for transfer of I/O requests, in order to satisfy the I/O performance requirements for the logical volume within the second storage device that is allocated to the virtual logical volume within the first storage device.

The management computer to solve the above problem is a management computer that manages: a first storage device that includes a first physical resource that forms a first pool, a first controller that processes input or output requests from a host computer, and a plurality of first ports; and a second storage device that includes a second physical resource that forms a second pool, a second controller, and a plurality of second ports that connect to the plurality of first ports of the first storage device. The management computer has: a memory for storing path configuration information that indicates a free capacity for input/output processing of a plurality of paths formed by the plurality of first ports and the plurality of second ports; and a processor that executes a process based on the information stored in the memory. The processor receives mapping requests for mapping a second logical volume, to which the second physical resource within the second pool is allocated, to a first logical volume that the first controller provides to the host computer, and a path performance request for a path used when transmitting to the second storage device the input or output request to the first logical volume that the first controller has received from the host computer. The processor selects one or a plurality of paths having an input/output processing free capacity that satisfies a path performance requirement, from among the plurality of paths formed by the plurality of first ports and the plurality of second ports, based on the path configuration information read from the memory. The processor sets the priority for the selected one or a plurality of paths, and selects a path based on the set priority. The processor sets to the host computer the use authorization for a primary port that forms the selected path and that is included in the plurality of first ports, a secondary port that forms the selected path and that is included in the plurality of second ports, and the second logical volume. Then the processor maps the second volume to the first volume via the primary port and the secondary port.

BRIEF DESCRIPTION OF THE DRAWINGS

FIG. 6 is a diagram showing an example of the logical volume configuration information in the present embodiment;

FIG. 7 is a diagram showing an example of the external connected volume configuration information in the present embodiment;

FIG. 8 is a diagram showing an example of the port configuration information in the present embodiment;

FIG. 9 is a diagram showing an example of the volume pool capacity information in the present embodiment;

FIG. 10 is a diagram showing an example of the pool capacity predicted value information in the present embodiment;

FIG. 11 is a diagram showing an example of the port performance information in the present embodiment;

FIG. 12 is a diagram showing an example of the port performance predicted value information in the present embodiment;

FIG. 13 is a diagram showing an example of the external connection path configuration information in the present embodiment;

DESCRIPTION OF THE PREFERRED EMBODIMENTS

Figure 1:
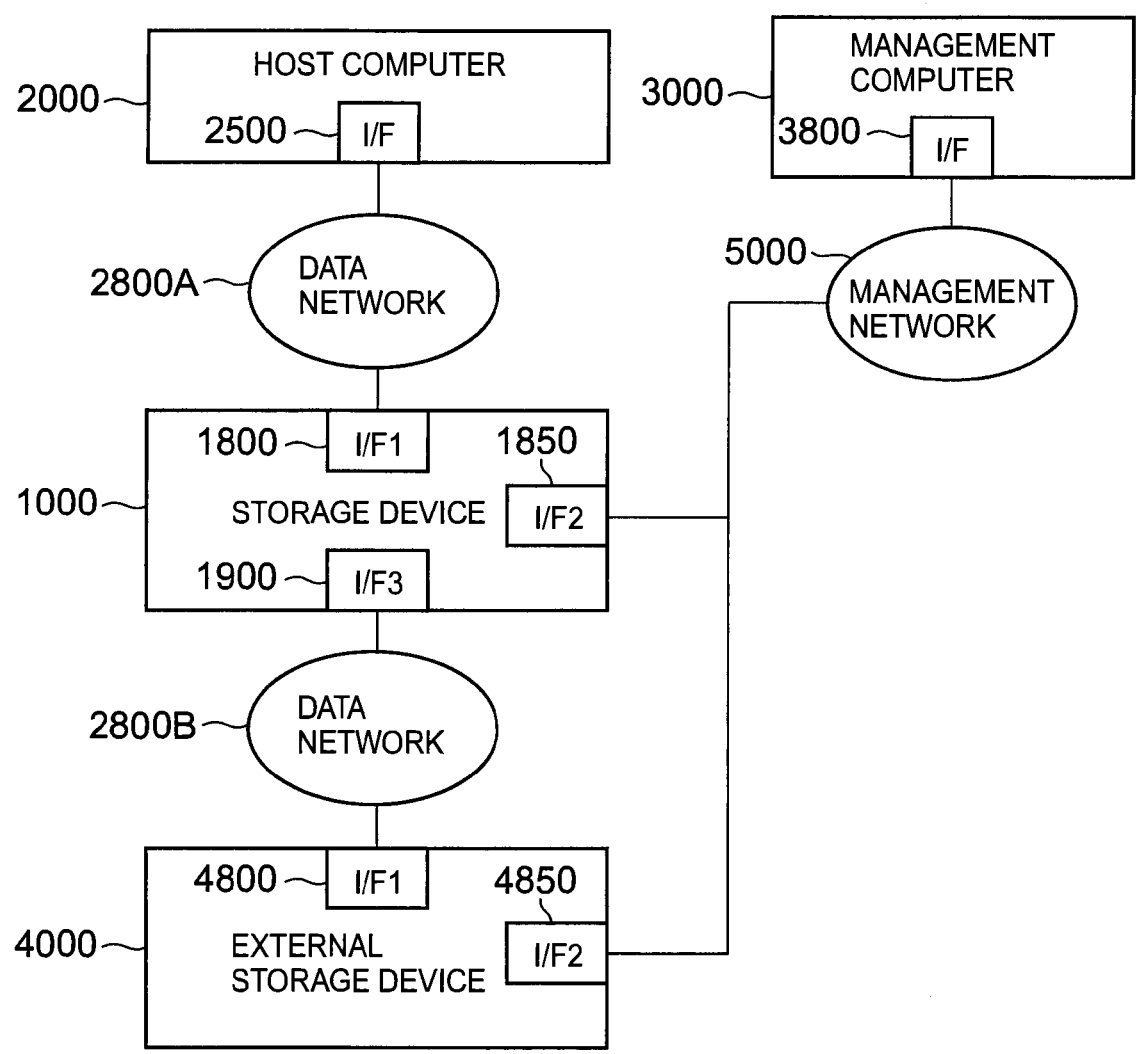
FIG. 1 is a diagram showing an example of the configuration of the storage system according to the present embodiment.

The following is an explanation of one embodiment of the present invention, with reference to the drawings. The present invention is not limited to the embodiments explained below. Also, in the following embodiments, parts having the same structure and are given the same reference numeral, and have the same operation as a rule, so duplication of operation is omitted.

Embodiment 1

The following is an explanation of the first embodiment with reference to FIG. 1 through FIG. 17. The system configuration of the present embodiment is explained using FIG. 1 through FIG. 12. FIG. 1 is a diagram showing an example of the configuration of the storage system according to the present embodiment.

The storage system includes a storage device 1000, a host computer 2000, a management computer 3000, and an external storage device 4000. Also, the storage device 1000 and the host computer 2000 are connected via a data network 2800A. The storage device 1000 and the external storage device 4000 are connected via a data network 2800B. In the present embodiment, the data networks 2800A, 2800B are storage area networks. However, the present embodiment is not limited to this, and the data networks 2800A, 2800B may be IP networks, or other data communication networks.

Also, the management computer 3000 and the storage device 1000 are connected via a management network 5000. Likewise, the management computer 3000 and the external storage device 4000 are connected via the management network 5000. In the present embodiment, the management network 5000 is an IP network. However, the present embodiment is not limited to this, and the management network 5000 may be a storage area network, or another data communication network.

In the present embodiment, the management computer 3000 is connected to the storage device 1000 and the external storage device 4000 via the management network 5000. However, a configuration in which the management computer 3000 and the host computer 2000 are connected, and the management computer 3000 obtains the storage device 1000 information via the host computer 2000 may also be used. Also, a configuration in which the management computer 3000 is included in the host computer 2000, and the two are provided as the same computer may be used.

Further, in the present embodiment, the data networks 2800A, 2800B, and the management network 5000 are separate networks. However, the data networks 2800A, 2800B, and the management network 5000 may be the same network. Also, for convenience of explanation, in FIG. 1 there is one storage device 1000, one host computer 2000, one management computer 3000, and one external storage device 4000, however the present embodiment is not limited to this.

The host computer 2000 includes an I/F 2500. The I/F 2500 is an interface with the data network 2800A, for exchange of data and control commands with the storage device 1000. Only one I/F 2500 is shown, but the present embodiment is not limited to this.

The storage device 1000 includes an I/F1 1800, I/F2 1850, and I/F3 1900. The I/F1 1800 is an interface with the data network 2800A, for exchange of data and control commands with the host computer 2000. The I/F2 1850 is an interface with the management network 5000, for exchange of data and control commands with the management computer 3000. The I/F3 1900 is an interface with the data network 2800B, for exchange of data and control commands with the external storage device 4000. The I/F1 1800, I/F2 1850, and I/F3 1900 indicate ports possessed by the storage device 1000 as described later. For convenience of explanation, the I/F1 1800, I/F2 1850, and I/F3 1900 have been shown as one each, but the present embodiment is not limited to this.

The external storage device 4000 includes an I/F1 4800 and an I/F2 4850. The I/F1 4800 is an interface with the data network 2800B, for exchange of data and control commands with the storage device 1000. The I/F2 4850 is an interface with the management network 5000, for exchange of data and control commands with the management computer 3000. The I/F1 4800 and I/F2 4850 indicate ports possessed by the external storage device 4000 as described later. For convenience of explanation, the I/F1 4800 and I/F2 4850 have been shown as one each, but the present embodiment is not limited to this.

The management computer 3000 includes an I/F 3800. The I/F 3800 is an interface with the management network 5000, for exchange of data and control commands with the storage device 1000 and the external storage device 4000. For convenience of explanation, the I/F 3800 has been shown as only one, but the present embodiment is not limited to this.

Figure 2:
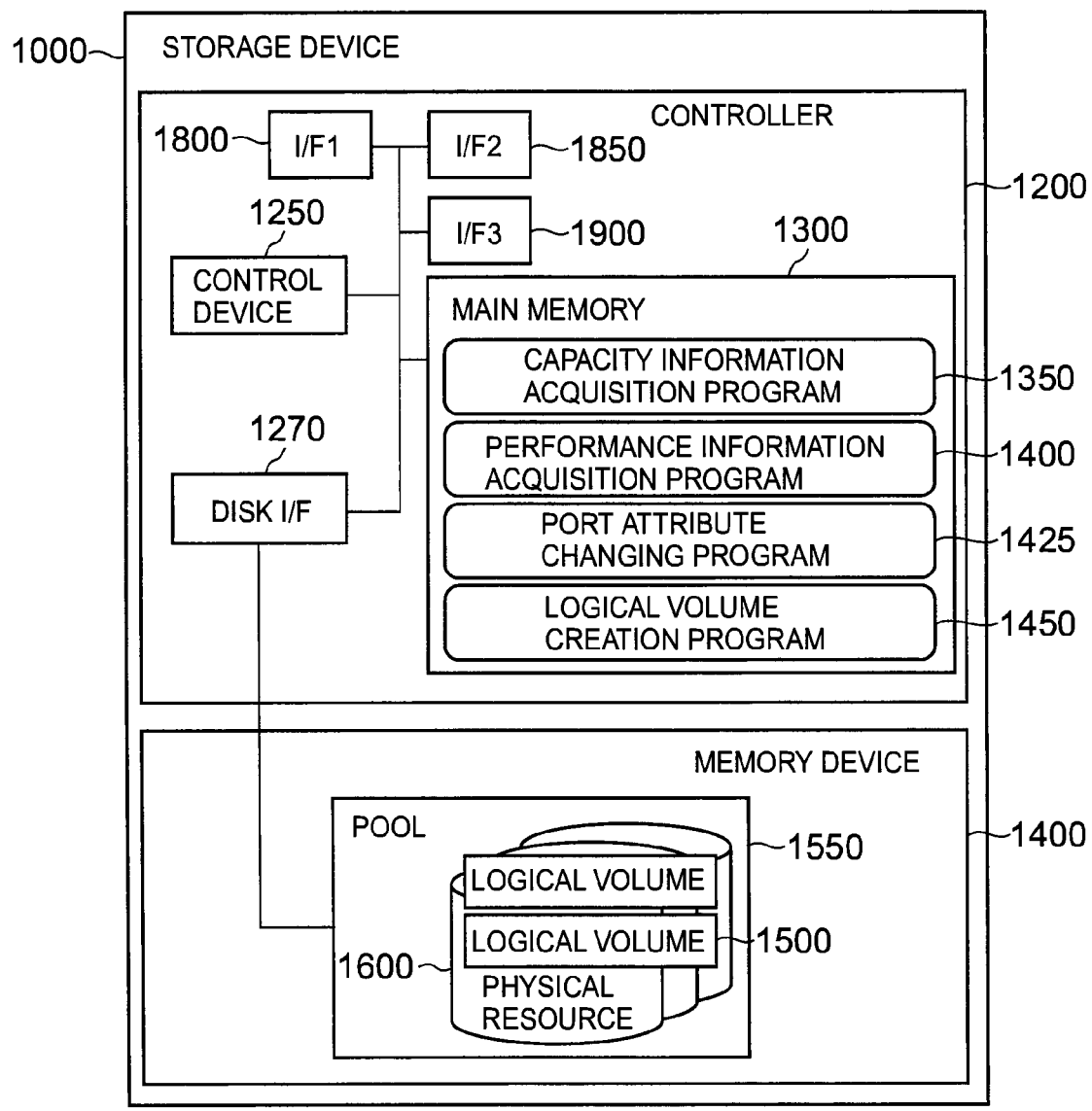
FIG. 2 is a diagram showing an example of the internal configuration of the storage device in the present embodiment.
Figure 3:
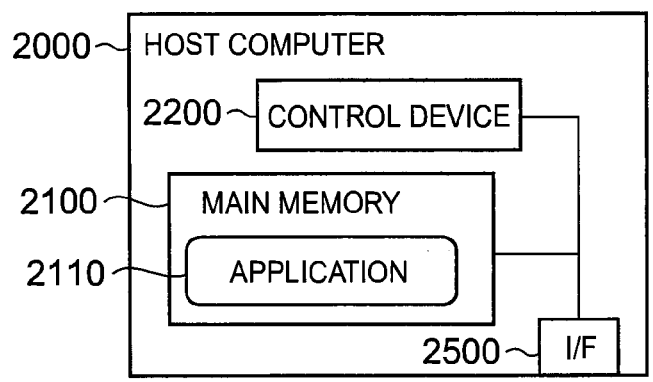
FIG. 3 is a diagram showing an example of the internal configuration of the host computer in the present embodiment.
Figure 4:
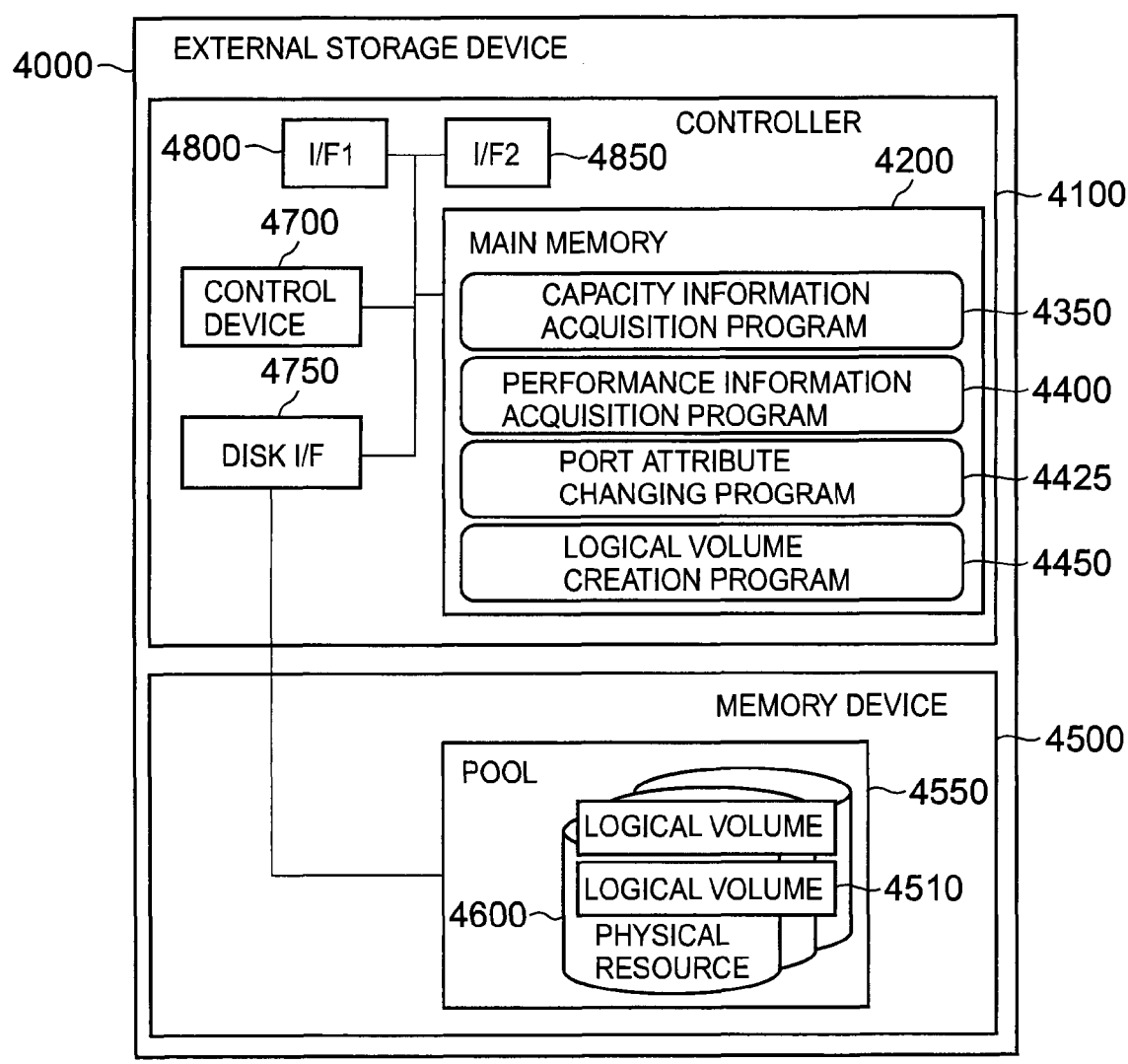
FIG. 4 is a diagram showing an example of the internal configuration of the external storage device in the present embodiment.
Figure 5:
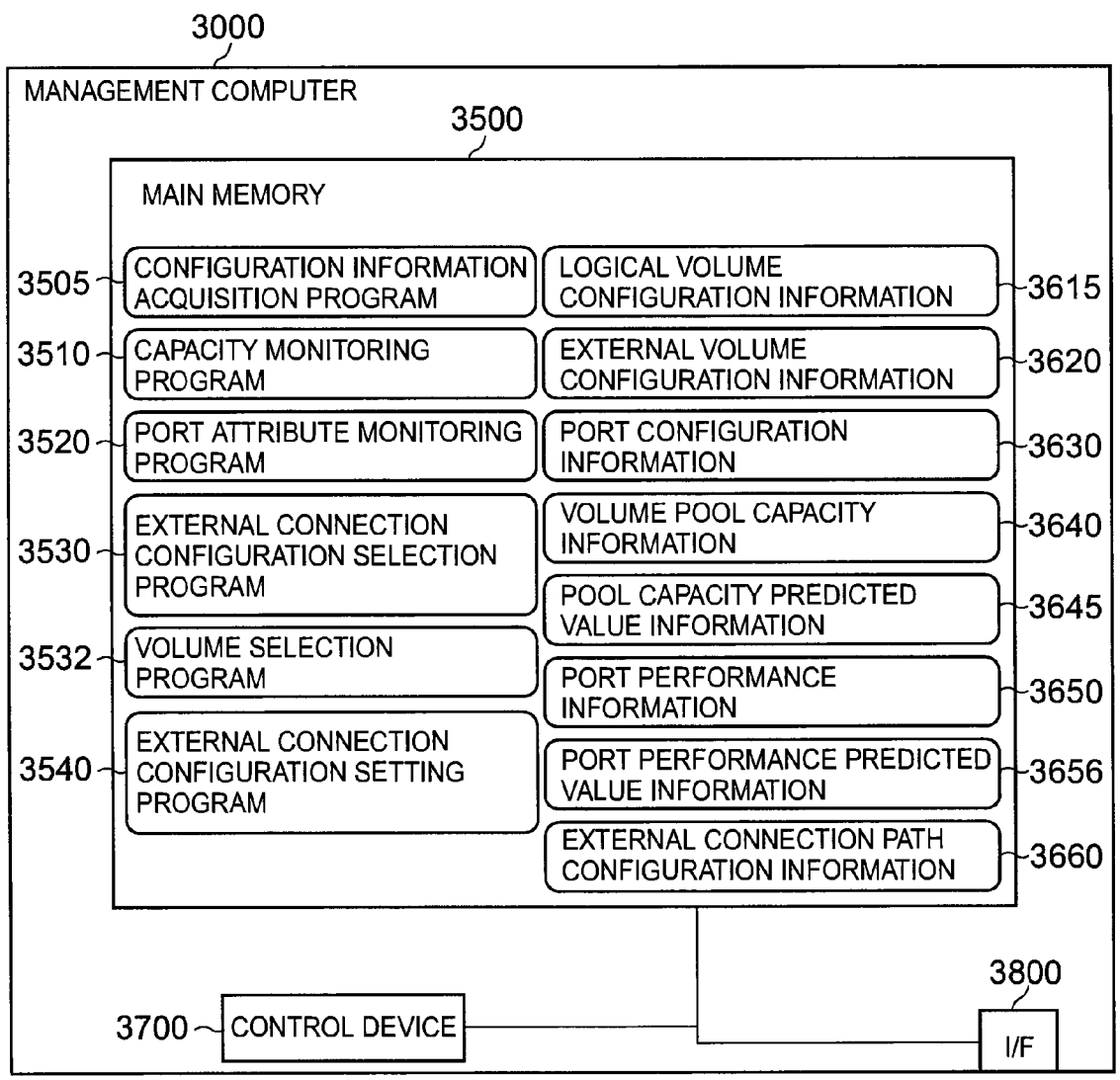
FIG. 5 is a diagram showing an example of the internal configuration of the management computer in the present embodiment.

In the following, FIG. 2 shows the internal configuration of the storage device 1000. FIG. 3 shows the internal configuration of the host computer 2000. FIG. 4 shows the internal configuration of the external storage device 4000. FIG. 5 shows the internal configuration of the management computer 3000.

FIG. 2 is a diagram showing an example of the internal configuration of the storage device 1000 in the present embodiment.

The storage device 1000 is configured to include a memory device 1400 that stores data, and a controller 1200 that carries out control within the storage device 1000 (for example, control of the RAID configuration of the memory device 1400, control of input and output to the memory device based on I/O requests from the host computer, and so on).

The memory device 1400 is constituted from a physical resource such as, for example, a hard disk drive (HDD) and/or a solid state drive (SSD). Also, the memory device 1400 includes a pool 1550 constituted from the physical resource 1600. A logical volume 1500 is formed from one or more physical resources 1600 included in the pool 1550, and the logical volume 1500 stores data that is used by the host computer 2000. For convenience of explanation, only one pool 1550 is indicated, but the present embodiment is not limited to this.

The pool 1550 includes one or more physical resources 1600. The pool 1550 is a logical group from the point of view of management, for overall management of the physical resources 1600. The point of view of management can be, for example, a RAID.

Also, in the present embodiment, the pool 1550 is constituted as a logical group of physical resources. The logical volume 1500 used by the user is formed from the pool 1550. However, the pool may also be constituted as a logical group of logical volumes, and the logical storage areas used by the user are formed from the pool. The logical volume 1500 can be a logical volume allocated by the physical resource 1600 of the storage device 1000, or a virtual logical volume allocated by the logical volume of the external storage device 4000.

The disk controller 1200 includes a main memory 1300, a control device 1250, an I/F1 1800, an I/F2 1850, an I/F3 1900, and a disk I/F 1270. The I/F1 1800, the I/F2 1850, and the I/F3 1900 are ports of the storage device 1000 as described later.

A capacity information acquisition program 1350, a performance information acquisition program 1400, a port attribute information changing program 1425, and a logical volume generation program 1450 are stored in the main memory 1300.

The capacity information acquisition program 1350 is a program that acquires information regarding the capacity of the logical volume within the storage device 1000 and transmits it to the management computer 3000, in accordance with instructions from the management computer 3000.

The performance information acquisition program 1400 is a program that acquires information regarding the I/O performance of the ports within the storage device 1000 and transmits it to the management computer 3000, in accordance with instructions from the management computer 3000.

The port attribute information changing program 1425 is a program that changes the attributes of the ports within the storage device 1000, in accordance with instructions from the management computer 3000. The port attributes include "Initiator" and "Target". "Initiator" indicates the port on the side issuing an I/O command, and "Target" indicates the port on the side receiving the I/O command.

The logical volume generation program 1450 is a program that generates logical volumes 1500 within the storage device 1000, in accordance with instructions from the management computer 3000.

The control device 1250 reads the capacity information acquisition program 1350, the performance information acquisition program 1400, the port attribute information changing program 1425, and the logical volume generation program 1450, which are stored in the main memory 1300, and executes them. Hereafter the execution of processes is explained using "program" as the subject, but actually the control device 1250, which is the processing unit that executes the programs, carries out the processes by executing the programs.

The disk I/F 1270 is an interface to the memory device 1400, that exchanges data and control commands. The I/F1 1800, the I/F2 1850, and the I/F3 1900 are as explained in connection with FIG. 1.

FIG. 3 is a diagram showing an example of the internal constitution of the host computer 2000 in the present embodiment.

The host computer 2000 is constituted to include a main memory 2100, a control device 2200, and an I/F 2500. The host computer 2000 may also include input and output devices (not shown on the drawing) such as a keyboard or a display device, and so on.

An application 2110 is stored in the main memory 2100. The application 2110 is a program for accessing the logical volume 1500 of the storage device 1000. An example of the application 2110 is a database management system (DBMS).

The control device 2200 reads and executes the application 2110 stored in the main memory 2100. Hereafter the execution of processes is explained using "application" as the subject, but actually the control device 2200, which is the processing unit that executes the application, carries out the processes by executing the program. The I/F 2500 is as explained for FIG. 1.

FIG. 4 is a diagram showing an example of the internal configuration of the external storage device 4000 in the present embodiment.

The external storage device 4000 is constituted to include a memory device 4500 that stores data, and a controller 4100 that controls the external storage device (for example, the memory device RAID control, or input and output control of the memory device based on I/O requests from the host computer (storage device 1000)).

The memory device 4500 has the same function as the memory device 1400 in the storage device 1000. Also, the controller 4100 allocates physical resources 4600 contained in a pool 4550 to a logical volume 4510. Also, the logical volume 4510 contained in the external storage device 4000 can be allocated to a virtual logical volume provided by the controller of the storage device 1000 to the host computer 2000. Also, when an I/O request is received from the host computer 2000 for the virtual logical volume, the controller 1200 of the storage device 1000 transmits the I/O request to the controller 4100 of the external storage device 4000 via a port. The controller 4100 of the external storage device 4000 executes a process based on the received I/O request in respect of the logical volume allocated to the virtual logical volume.

A capacity information acquisition program 4350, a performance information acquisition program 4400, a port attribute information changing program 4425, and a logical volume generation program 4450 are stored in the main memory 4200.

The capacity information acquisition program 4350 is a program that acquires information regarding the capacity of the logical volume within the external storage device 4000 and transmits it to the management computer 3000, in accordance with instructions from the management computer 3000. The performance information acquisition program 4400 is a program that acquires information regarding the I/O performance of the ports within the external storage device 4000 and transmits it to the management computer 3000, in accordance with instructions from the management computer 3000. The port attribute information changing program 4425 is a program that changes the attributes of the ports within the external storage device 4000, in accordance with instructions from the management computer 3000. The logical volume generation program 4450 is a program that generates logical volumes 4510 within the external storage device 4000, in accordance with instructions from the management computer 3000.

The control device 4700 reads the capacity information acquisition program 4350, the performance information acquisition program 4400, the port attribute information changing program 4425, and the logical volume generation program 4450, which are stored in the main memory 4200, and executes them. Hereafter the execution of processes is explained using "program" as the subject, but actually the control device 4700, which is the processing unit that executes the programs, carries out the processes by executing the programs.

The disk I/F 4750 is an interface to the memory device 4500, that exchanges data and control commands. The I/F1 4800 and the I/F2 4850 indicate ports of the external storage device 4000, as explained later, and are as explained in connection with FIG. 1.

FIG. 5 is a diagram showing an example of the internal configuration of the management computer 3000 in the present embodiment.

The management computer 3000 is constituted to include a main memory 3500, a control device 3700, and an I/F 3800. The management computer 3000 may also include input and output devices (not shown on the drawing) such as a keyboard or a display device, and so on.

A configuration information acquisition program 3505, a capacity monitoring program 3510, a port performance monitoring program 3520, an external connection constitution selection program 3530, a volume selection program 3532, and an external connection configuration setting program 3540 are stored in the main memory 3500. Also, logical volume configuration information 3615, external connection volume configuration information 3620, port configuration information 3630, volume pool capacity information 3640, pool capacity predicted value information 3645, port performance information 3650, port performance predicted value information 3656, and external connection path configuration information 3660 is stored in the main memory 3500.

The configuration information acquisition program 3505 is a program that acquires the configuration information for each logical volume, each external connected volume, and each port from the capacity information acquisition program 1350 and the performance information acquisition program 1400 of the storage device 1000, and the capacity information acquisition program 4350 and the performance information acquisition program 4400 of the external storage device 4000, and stores this acquired information in the logical volume information 3615, the external connected volume configuration information 3620, the port configuration information 3630, and the external connection path configuration information 3660.

The capacity monitoring program 3510 instructs the capacity information acquisition program 1350 of the storage device 1000 and the capacity information acquisition program 4350 of the external storage device 4000 to transmit capacity information at arbitrary time intervals.

Also, the capacity monitoring program 3510 receives information regarding the capacity of the pool or the volume within the storage device 1000 and information regarding the capacity of the pool or the volume within the storage device 4000 from the capacity information acquisition programs 1350 and 4350, and stores the received information in the volume pool capacity information 3640. Further, the capacity monitoring program 3510 calculates the predicted value of the pool capacity using the volume pool capacity information 3640, and stores the predicted value in the pool capacity predicted value information 3645.

The port performance monitoring program 3520 instructs the performance information acquisition programs 1400 and 4400 of the storage device 1000 and the external storage device 4000 to transmit I/O performance information for each port at arbitrary time intervals. Also, the port performance monitoring program 3520 receives information regarding the I/O performance of each port within the storage device 1000 and the external storage device 4000 from the performance information acquisition programs 1400 and 4400, and stores the received information in the port performance information 3650. Further, the port performance monitoring program 3520 calculates the port performance predicted value using the port performance information 3650, and stores the predicted value in the port performance predicted value information 3656.

The external connection configuration selection program 3530 selects a storage device that can be connected by a physical connection in accordance with the requirements that the logical volume should fulfill input by the user, using the port configuration information 3630 and the external connection path information 3660. Then, the external connection configuration selection program 3530 transmits information on the selected storage device and the requirements input by the user to the volume selection program 3552. Also, the external connection configuration selection program 3530 receives information on the storage device that is a candidate for allocation from the volume selection program 3552. Then, the external connection configuration selection program 3530 selects a path that will fulfill the user's requirements from among the external connection paths to the storage device that is the candidate for allocation, using the external connection path configuration information 3660. Then, the external connection configuration selection program 3530 selects the external connection configuration that satisfies the user's requirements using the pool volume predicted value information and the port performance predicted value information.

The user inputs to the management computer 3000 information regarding a first storage device directly connected to the host computer, and the requirements regarding path or logical volume. In the present embodiment, in order that the explanation does not become complex, the requirements regarding logical volume means requirements regarding capacity, requirements regarding I/O performance, and the time band that the data stored in the logical volume is mainly used. However, the requirements are not limited to these, and other values indicating the I/O performance, such as the cache allocation amount, which is related to the I/O performance, the disk revolutions per minute (RPM), or the RAID level, and so on, or a combination of these, may be used as the requirements for the path or the logical volume.

The volume selection program 3532 receives the information regarding the storage device and the requirements for the logical volume from the external connection configuration selection program 3530, and selects the external connection destination second storage device that complies with the requirements specified by the user, using the logical volume configuration information 3615 and the volume pool capacity information 3640. Then, the volume selection program 3532 transmits the selected second storage device information and information regarding whether a logical volume must be created in the second storage device to the external connection configuration selection program 3530.

The external connection configuration setting program 3540 is a program that sets the external connection configuration received from the external connection configuration selection program 3530.

The logical volume configuration information 3615 is information indicating the configuration of the logical volumes possessed by the storage device 1000 and the external storage device 4000. Examples of logical volume configuration information include an identification name of the storage device, a logical unit number (LUN) which is an identifier of the logical volume, an identifier for the pool that includes the logical volume, the logical volume capacity, and flag information indicating whether or not the logical volume is allocated to a host.

The external connection volume configuration information 3620 is information that contains the mapping information between the logical volume of the storage device 1000 and the logical volume of the external storage device 4000 in an external connection configuration. Examples of the volume mapping information of an external connection configuration include the identifying name of the storage device, the LUN of the storage logical volume, the external storage identifying name, and the LUN of the external storage logical volume. If the logical volume of the external storage device is allocated to the logical volume of the storage device, the logical volume of the storage device becomes a virtual logical volume, and actually physical resources are allocated to the logical volume of the mapped external storage device.

The port configuration information 3630 is information that contains the configuration information of each port of the storage device 1000 and the external storage device 4000. Examples of the port configuration information include the storage device identifying name, the port identifier, the port attribute, and flag information indicating whether or not the LUN security is set for the port. In the present embodiment, it is assumed that the device that contains the port is the storage device, but the present embodiment is not limited to this, and a switch device, or a device other than a switch device or a storage device may have a port.

The volume pool capacity information 3640 is information that retains the log information of the pool capacity of the storage device. Examples of log information of the pool capacity includes the storage device identification name, the pool identifier, the total capacity of the pool, the time of measurement of the log, and the free capacity of the pool at the time of measurement.

The pool capacity predicted value information 3645 is information that contains the predicted value of the pool capacity. Examples of the pool capacity predicted value information include the storage device identification name, the pool identifier, the time of prediction of the free capacity of the pool, and the predicted value of the free capacity of the pool at the time of prediction.

The port performance information 3650 is information that contains the I/O performance log information for each port of the storage device 1000 and the external storage device 4000. Examples of the port I/O performance log information include the storage device identification name, the port identifier, the maximum input output per second (IOPS) given in the catalog or manual, the measurement time of the log, and the port IOPS at the measurement time.

The port performance predicted value information 3656 is information that contains the predicted value of the port I/O performance. Examples of the predicted value information of the port performance information include the storage device identification name, the port identifier, the time of prediction of the port IOPS, and the predicted value of the port IOPS at the time of the prediction.

The external connection path configuration information 3660 is information that contains the path information for external connection of the first storage device and the second storage device. Examples of the path information used for external connection include the path identifier, the first port identifier, the second port identifier, and information indicating the port status.

The control device 3700 reads and executes the configuration information acquisition program 3505, the capacity monitoring program 3510, the port performance monitoring program 3520, the external connection constitution selection program 3530, the volume selection program 3522, and the external connection configuration setting program 3540 which are stored in the main memory 3500. Hereafter the execution of processes is explained using "program" as the subject, but actually the control device 3700, which is the processing unit that executes the programs, carries out the processes by executing the programs.

The I/F 3800 is an interface with the management network 5000, for exchanging data and control commands between the storage device 1000 and the external storage device 4000.

FIG. 6 shows an example of the logical volume configuration information 3615 in the present embodiment. The logical volume configuration information 3615 is information indicating the logical volume configuration, and includes a storage name T250, a LUN T260, a pool ID T270, a capacity T280, and a host allocation flag T290. Information for identifying the storage device 1000 and the external storage device 4000 is stored in the storage name T250. (Str_1 indicates the storage device 1000, and Str_2 indicates the external storage device 4000.)

Numbers for identifying the logical volume 1500 of the storage device 1000 and the logical volume 4510 of the external storage device 4000 are stored in the LUN T260. Information for identifying the pool that includes the physical resources constituting the LUN T260 is stored in the pool ID T270. In the present embodiment, the physical resource ID is expressed by a number, but an identifying name arbitrarily set by the user may also be used.

The capacity of the LUN T260 is stored in the capacity T280. Information indicating whether or not the LUN T260 has been allocated to a host is stored in the host allocation flag T290. In the present embodiment, in the host allocation flag T290, "1" indicates that the LUN has been allocated to a host, and "0" indicates that the LUN has not been allocated. Instead of "1", an arbitrary character string, such as "allocated", for example, may be used. As shown in FIG. 7, in the case of a logical volume for which the host allocation flag is "1" and the pool ID is not allocated, the logical volume of the external storage device 4000 is allocated.

FIG. 7 is a diagram showing an example of the external connection volume configuration information 3620 in the present embodiment.

The external connection volume configuration information 3620 is information indicating the configuration of the volume used in external connection, and includes a storage name T300, a LUN T310, an external storage name T320, and an external LUN T330. Information for identifying the storage device that is directly connected to the host in an external connection configuration is stored in the storage name T300. The LUN of the logical volume of the storage device stored in the storage name T300 is stored in the LUN T310. Information for identifying the external connection destination storage device is stored in the external storage name T320. The LUN of the logical volume used as the external connection volume, possessed by the external connection destination storage device is stored in the external LUN T330. Also, when the logical volume of the storage device is a virtual logical volume, actually physical resources are allocated to the logical volume of the mapped external storage device.

FIG. 8 is a diagram showing an example of the port configuration information 3630 in the present embodiment. The port configuration information 3630 is information indicating the port configuration information, and includes a storage name T400, a port ID T410, an attribute T420, and a use flag T430. Information for identifying the storage device having the port is stored in the storage name T400. In the present embodiment, the device having a port is assumed to be a storage device, but it may be a switch device, or a device other than these devices.

Information for identifying the port is stored in the port ID T410. In the present embodiment, the port ID is expressed as a world wide name (WWN), but another identifier may be used. The attribute of the port is stored in the attributes T420.

Information for identifying whether or not the port is being used by the host computer (whether or not use authorization has been set) is stored in the use flag T430. One means for identifying whether or not use authorization has been set for the port is whether or not it is possible to determine that LUN security has been set for the port. In the present embodiment, in the use flag T430, "1" indicates that LUN security has been set for the port, and "0" indicates that LUN security has not been set for the port. Indicating that the LUN security has been set may be expressed by information other than "1".

LUN security is technology for setting security by granting use authorization to users for the WWN of the port of the host bus adapter (HBA), which is the storage interface of the host computer, or the WWN of the port of the storage device. However, the method of setting security is not limited to LUN security. Although omitted from the diagram so that the explanation does not become too complex, in the present embodiment, in a switch device that forms the data network 2800, security can be achieved for the connection paths of the data network by port zoning or the like.

FIG. 9 is a diagram showing an example of the volume pool capacity information 3640 in the present embodiment. The volume pool capacity information 3640 is information indicating the pool capacity, and includes a storage name T500, a pool ID T510, a capacity T520, a measurement time T530, and a free capacity T540. Information for identifying the storage device that contains the pool is stored in the storage name T500. Information for identifying the pool is stored in the pool ID T510. The maximum capacity of the pool is stored in the capacity T520. The time of measurement of the pool free capacity is stored in the measurement time T530. The free capacity of the pool ID T510 at the measurement time T530 is stored in the free capacity T540.

FIG. 10 is a diagram showing an example of the pool capacity predicted value information 3645 in the present embodiment. The pool capacity predicted value information 3645 is information indicating the predicted value of the pool free capacity, and includes a storage name T550, a pool ID T555, a time T560, and an free capacity predicted value T565.

Information for identifying the storage that includes the pool is stored in the storage name T550. Information for identifying the pool is stored in the pool ID T555. The time of predicting the free capacity of the pool is stored in the time T560. The time may be determined by the capacity monitoring program 3510, or it may be arbitrarily determined by the user. The predicted value of the free capacity of the pool indicated by the pool ID T555 is stored in the free capacity predicted value T565. Also, in the present embodiment, the case where the pool is a logical group of physical resources has been explained. However, as stated previously when explaining FIG. 2, the pool may also be a logical group of logical volumes.

FIG. 11 is a diagram showing an example of the port performance information 3650 in the present embodiment. The port performance information 3650 is information indicating the port I/O performance, and includes a storage name T600, a port ID T610, a port maximum IOPS (maximum input/output processing capacity) T620, a measurement time T630, and the IOPS at the measurement time (amount of input/output processing at the measurement time) T640.

Information for identifying the storage device containing the port is stored in the storage name T600. Information for identifying the port is stored in the port ID T610. The maximum value of the IOPS indicated in the catalog or manual for the port is stored in the port maximum IOPS T620. IOPS represents the number of I/O that can be carried out in one second. The time that the IOPS was measured is stored in the measurement time T630. At the measurement time, in the IOPS T640 the number of I/O per second is stored as IOPS at the measurement time T630 of the port. Also, the usage time band as a proportion of the catalog performance indicated by T620 or the like may be stored in T640.

FIG. 12 is a diagram showing an example of the port performance predicted value information 3656 in the present embodiment. The port performance predicted value information 3656 is information indicating the predicted value of the port performance, and includes a storage name T670, and a port ID T673, a time T676, and an IOPS predicted value T679. Information for identifying the storage that contains the port is stored in the storage name T670. Information for identifying the port is stored in the port ID T673. The time that the IOPS was measured for the port is stored in the time T676. The time may be determined by the port performance monitoring program 3520, or it may be arbitrarily set by the user. The predicted value of the IOPS of the port indicated by the port ID T673 is stored in the IOPS predicted value T679 (predicted value of the input/output processing amount).

FIG. 13 is a diagram showing an example of the external connection path configuration information 3660 in the present embodiment. The external connection path configuration information 3660 is information indicating the external connection path configuration, and includes a path ID T700, a primary port ID T710, a secondary port ID T720, and a status T730.

Information for distinguishing the external connection path is stored in the path ID T700. Information for distinguishing the initiator side port is stored in the primary port ID T710. Information for distinguishing the target side port is stored in the secondary port ID T720. The external connection configuration status indicated by the combination of the primary port ID and the secondary port ID is stored in the status T730. In the present embodiment, "the same housing" is set in the status T730 when the primary port and the secondary port are in the same storage device. When the primary port and the secondary port are in different storage devices, and are not physically connected, "no physical connection" is set in the status T730. When the primary port and the secondary port are in different storage devices, and are physically connected, and the attribute of the primary port is "initiator" and the attribute of the secondary port is "target", "can be used" is set in the status T730. When the primary port and the secondary port are in different storage devices, and are physically connected, but the attribute of the primary port is not "initiator" and the attribute of the secondary port is not "target", and LUN security has not been set for the two ports, "attributes must be changed" is set in the status T730. However, other statuses apart from these may also be used.

In the following, the operation of the present embodiment is explained with reference to the flowcharts in FIG. 14 through FIG. 18.

Figure 14:
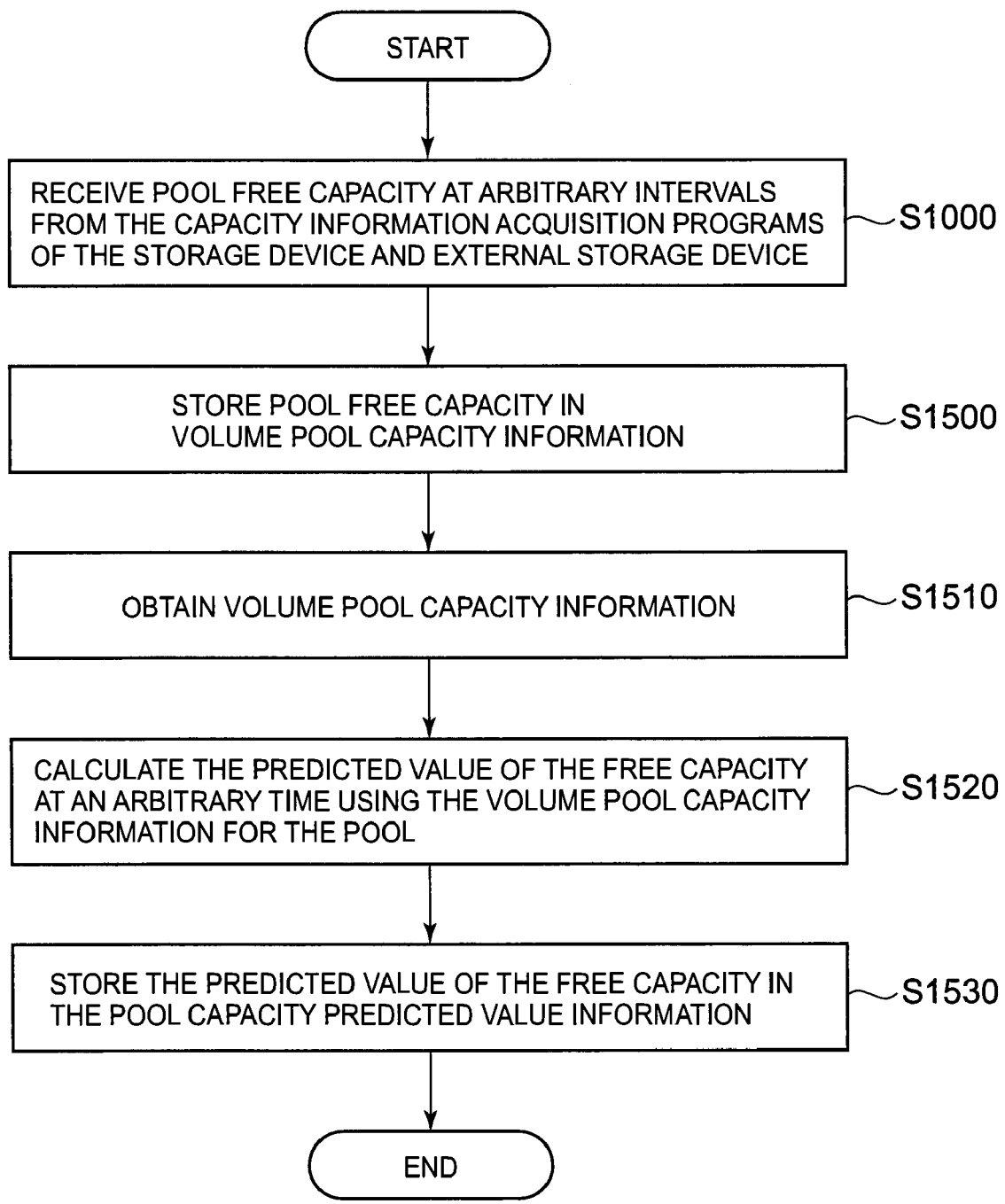
FIG. 14 is a diagram showing an example of the capacity monitoring program process in the present embodiment.

FIG. 14 is a diagram showing an example of the capacity monitoring program 3510 process in the present embodiment.

The capacity monitoring program 3510 receives the free capacity of the physical resource contained in an arbitrary pool at arbitrary time intervals from the capacity information acquisition programs 1350 and 4350, for the storage device and the external storage device (S1000). The interval for receiving the free capacity may be determined by the capacity monitoring program 3510. Also, the interval for receiving the free capacity may be determined by another scheduler provided by the OS or the like, or it may be arbitrarily determined by the user.

Also, the method of receiving the free capacity may be the method in which the capacity monitoring program continuously sends capacity acquisition requests to the capacity information acquisition program at arbitrary intervals, or the method in which the capacity information acquisition program continuously sends the capacity monitoring program free capacity information at arbitrary intervals, or another method.

The capacity monitoring program 3510 stores the free capacity information for the physical resource contained in the pool received in the previous process (S1000) in the volume pool capacity information 3640 (S1500).

The capacity monitoring program 3510 obtains the volume pool capacity information 3640 (S1510).

The capacity monitoring program 3510 calculates the predicted value of the free capacity at an arbitrary time by using the volume pool capacity information 3640 for the pool (S1520). The time may be determined by the capacity monitoring program 3510, or it may be arbitrarily determined by the user. The method of obtaining the predicted value of the free capacity may be the method as described below. However, the present embodiment is not limited to this.

The method is a method of obtaining the predicted value of the free capacity based on the free capacity of the pool at an arbitrary plurality of times. Specifically, in the pool of the volume pool capacity information 3640 the amount of reduction (or the amount of increase) per unit time is calculated from the time interval of two arbitrary points of time (for example, the two immediately prior measurement times) and the change in free capacity at the two arbitrary times. Then, the predicted value of the sparey capacity is calculated from the elapsed time from an arbitrary one point (for example, one immediately prior measurement time) and the calculated amount of reduction (or amount of increase) per unit time.

Then, the capacity monitoring program 3510 stores the predicted value of spare pool capacity calculated in the previous process (S1520) in the pool free capacity predicted value 6550 (S1530).

Figure 15:
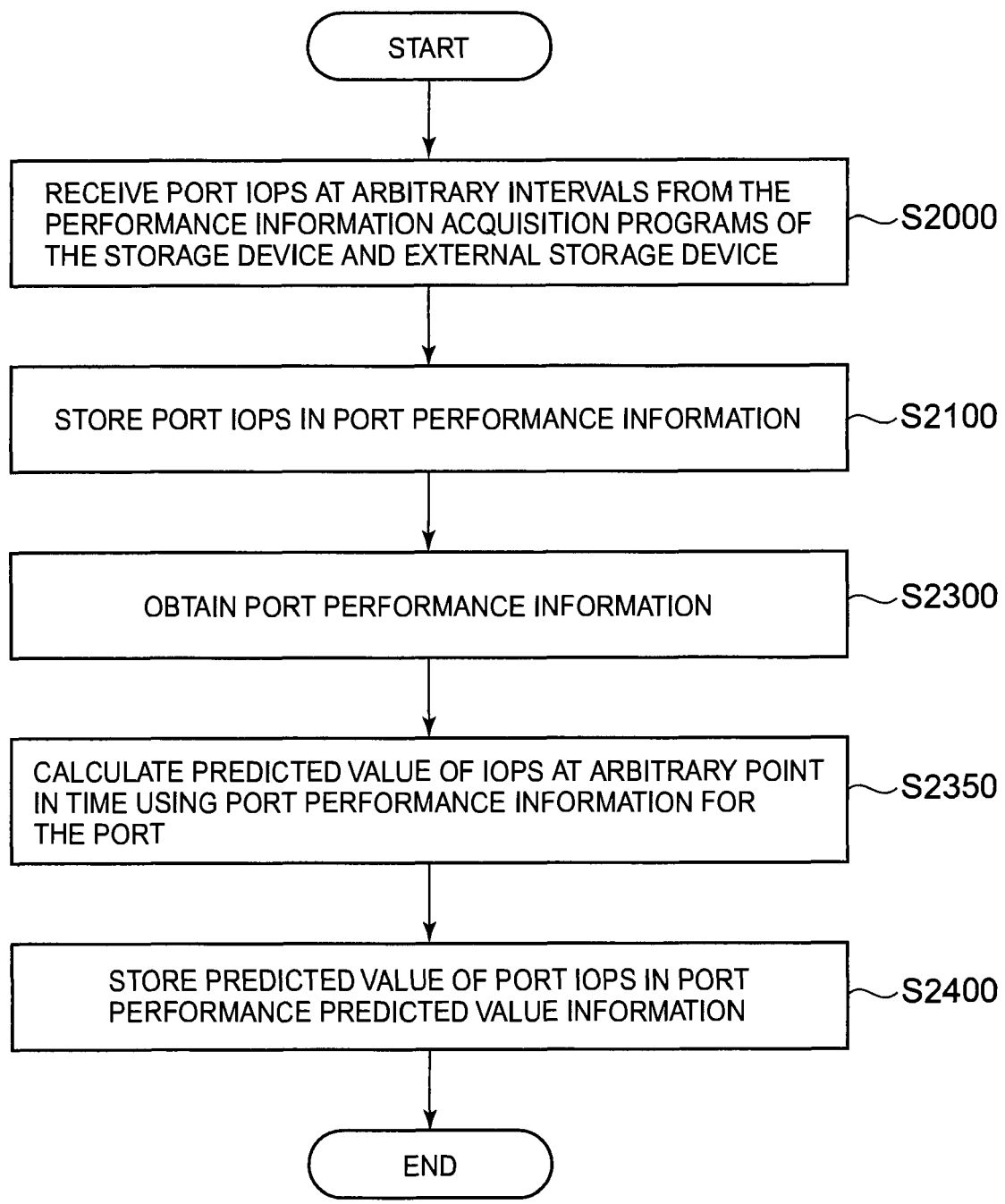
FIG. 15 is a diagram showing an example of the port capacity monitoring program process in the present embodiment.

FIG. 15 is a diagram showing an example of the port capacity monitoring program 3520 process in the present embodiment.

The port capacity monitoring program 3520 receives the IOPS for an arbitrary port at arbitrary time intervals from the performance information acquisition programs 1400 and 4400 of the storage device and the external storage device (S2000).

The interval for receiving the port IOPS may be determined by the port monitoring program 3520, or it may be determined by the performance information acquisition programs 1400 or 4400. Also, the method of receiving the port IOPS may be the method in which the port performance monitoring program continuously sends performance information acquisition requests to the performance information acquisition program at arbitrary intervals, or the method in which the performance information acquisition program continuously sends the empty capacity information to the port performance monitoring program at arbitrary intervals, or a method other than these methods.

The port performance monitoring program 3520 stores the port IOPS information received in the previous process (S2000) in the port performance information 3650 (S2100).

The port performance monitoring program 3520 obtains the port performance information 3650 (S2300).

The port performance monitoring program 3520 calculates (S2350) the predicted value of the port IOPS at an arbitrary time using the port performance information 3650 obtained in the previous process (S2300). The method of obtaining the predicted value of the port IOPS may be as follows. However, the present embodiment is not limited to this.

The method is the method of obtaining the predicted value of the port IOPS based on the IOPS at an arbitrary plurality of times. Specifically, the amount of reduction (or the amount of increase) per unit time for the port in the port performance information 3650 is calculated from the time interval of two arbitrary points of time (for example, the two immediately prior measurement times) and the change in IOPS at the two arbitrary times. Then, the predicted value of the IOPS is calculated from the elapsed time from an arbitrary one point (for example, one immediately prior measurement time) and the calculated amount of reduction (or amount of increase) per unit time.

Also, a different method is to classify the IOPS measured in the past according to measurement time and measurement day of the week, and to calculate the average value of IOPS for each day of the week and time. Then for the prediction time and day of the week, the calculated average value of the IOPS is calculated to be the predicted value of the IOPS.

The port performance monitoring program 3520 stores the predicted value of the port IOPS calculated in the previous process (S2400) in the port performance predicted value information 3656 (S2400).

Figure 16:
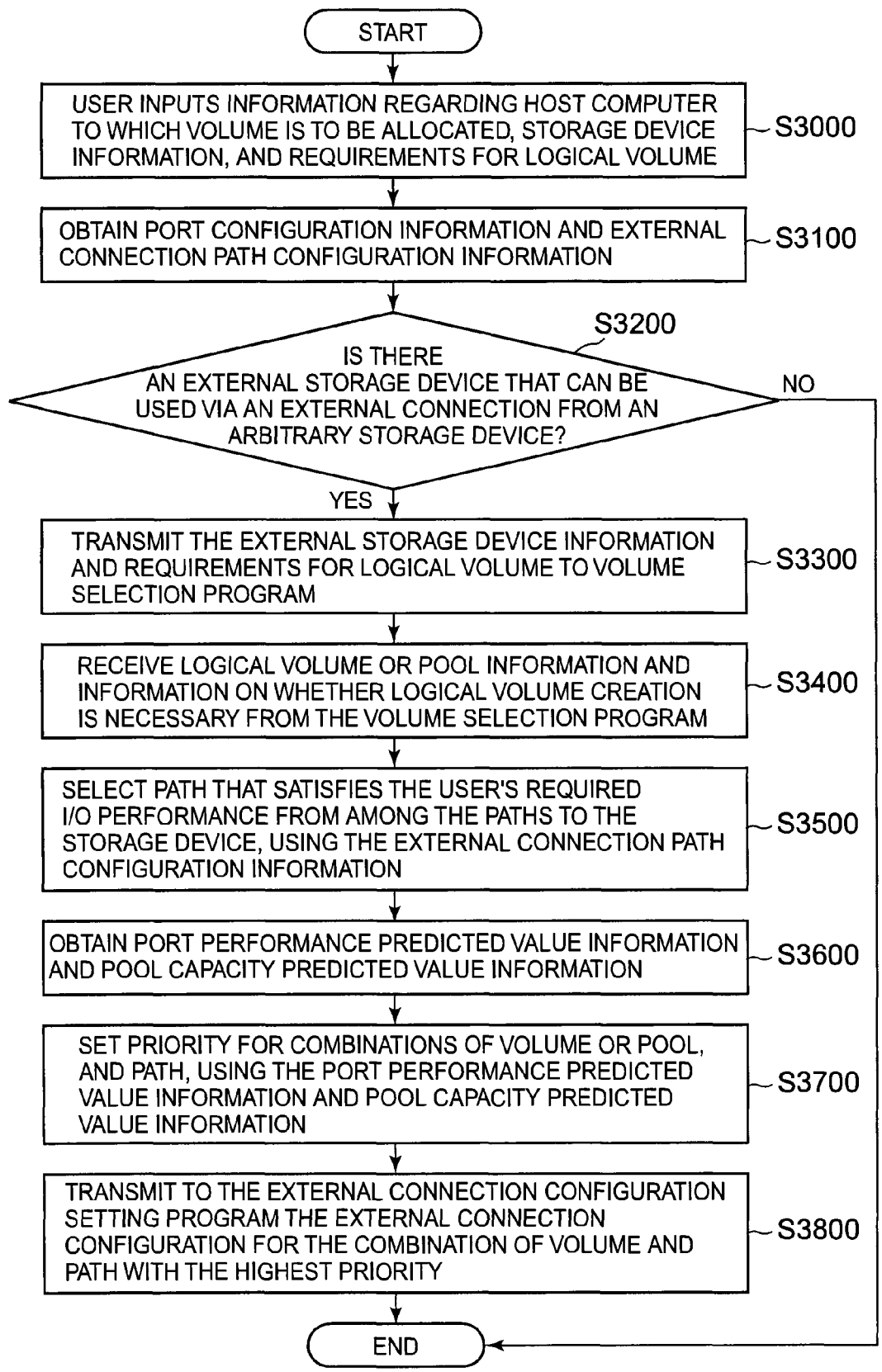
FIG. 16 is a diagram showing an example of the external connection configuration selection program process in the present embodiment.

FIG. 16 is a diagram showing an example of the external connection configuration selection program 3530 process in the present embodiment.

The user (storage administrator) inputs via an input device (user interface) of the management computer 3000 the identifier for the I/F 2500, which is the port of the host computer to which the logical volume is allocated, identification information for the storage device 1000 directly connected to the host computer via the data network 2800A, and the requirements for the logical volume to be allocated to the host computer (S3000).

Then the management computer 3000 receives the request from the user. The request is a request for allocating the logical volume of the external storage device 4000 that fulfills the received requirements to the logical volume (virtual logical volume) of the storage device 1000.

In order to avoid complex explanation on the present invention, here the requirements for the logical volume include a capacity requirement, an I/O performance requirement, and a main use time band for the data stored in the logical volume. However, the present embodiment is not limited to this, and in addition a cache allocation amount related to I/O performance, another value indicating the I/O performance, such as the disk RPM or the RAID level, and so on, or a combination of these requirements may be used. Also, the main use time band may be obtained from the objective of use of the logical volume or from the application that will be used, or it may be arbitrarily set by the user.

The external connection configuration selection program 3530 obtains the port configuration information 3630 and the external connection path configuration information 3660 (S3100).

It is determined whether or not there is an external storage device that can be connected to via a physical connection from the storage device specified in S3000 (S3200). Specifically, the external connection configuration selection program 3530 identifies the port of the storage device using the port configuration information 3630. Then, using the external connection path configuration information 3660, it is determined whether there is a path whose status is "can be used" or "attributes must be changed" assuming the port is a primary port. If there is a path whose status is "can be used" or "attributes must be changed", it is determined that there is an external storage device to which a connection can be made from the specified storage device via a physical connection.

Figure 17:
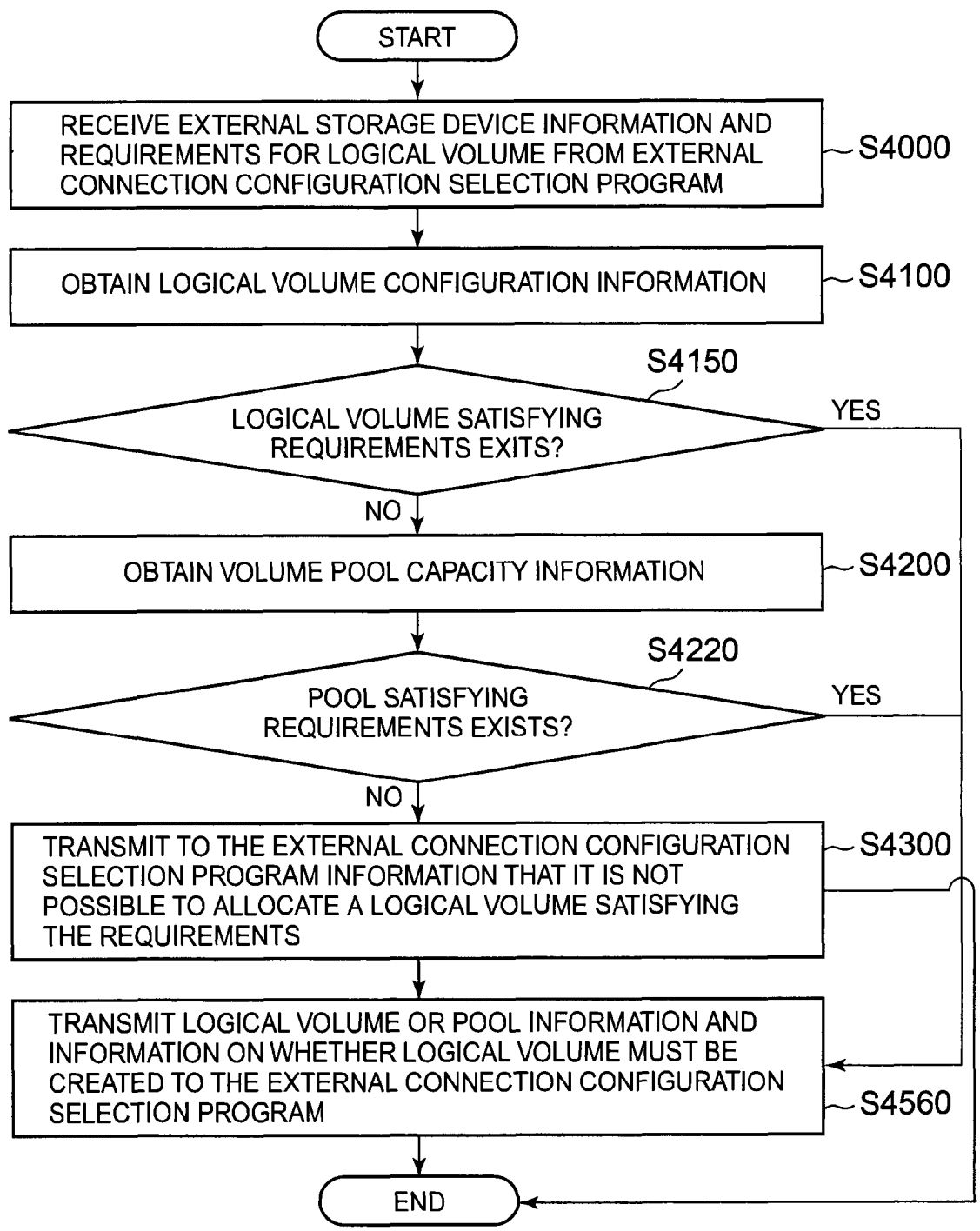
FIG. 17 is a diagram showing an example of the volume selection program process in the present embodiment.

When it is determined that there is an external storage device (S3200: YES), information regarding the external storage device and the requirements for the logical volume specified in S3000 are sent to the volume selection program 3532, using the port configuration information 3630 and the external connection path configuration information 3660 (S3300). An example of the volume selection program flowchart is shown in FIG. 17.

When it is determined that there is no external storage device (S3200: NO), a message that there is no such external connection configuration is displayed on the output device of the management computer 3000, and the process is terminated.

After the above process (S3300), the external connection configuration selection program 3530 receives from the volume selection program 3532 the information regarding the logical volume that satisfies the specified requirements or information regarding the pool that satisfies the specified requirements, that is contained in the external storage device, and information regarding whether a logical volume needs to be created or not (S3400).

In the present embodiment, "information regarding the logical volume" includes the LUN of the volume, the storage device name, and the like. "Pool information" includes information such as the pool identifier, the storage device name, and the like. However, the present embodiment is not limited to this.

Then, using the external connection path configuration information 3660, a path that satisfies the I/O performance of the user's requirements (input output/processing performance) is selected from among the paths between the storage device and the external storage device (S3500). Specifically, using the port configuration information 3630 and the external connection path configuration information 3660, the following comparison is carried out for paths having the primary port ID of a port of the storage device, and the secondary port ID of a port of the external storage device.

A comparison is carried out between the user's required IOPS and the smaller value of: the IOPS difference (free capacity in the amount of input/output processing of the primary port) between the primary port maximum IOPS (maximum input output amount) and the value of the IOPS T630 (input output amount at the measurement time) at the measurement time of the primary port; and the IOPS difference (free capacity in the amount of input/output processing of the secondary port) between the secondary port maximum IOPS and the value of the IOPS T630 (input output amount at the measurement time) at the measurement time of the secondary port.

Then, the path is selected for which the smaller of the free capacity in the amount of input/output processing of the primary port and the free capacity in the amount of input/output processing of the secondary port is equal to or greater than the IOPS required by the user (input/output processing performance).

Here, when selecting the path, the IOPS at the measurement time of the primary port and the secondary port may be measured as a pre-process of S3500, or the IOPS at the immediately previous measurement time may be used. In the present embodiment, the case where the path that satisfies the user's required I/O performance only is selected has been described, but a constitution in which the path that is closest to the user's required performance is selected may also be used.

By selecting the path as described above, an external connection configuration for the external storage device which can be connected to the storage device specified in S3000 can be obtained. In other words, it is possible to form an external connection configuration for access to the logical volume of the external storage device from the storage device via a path that satisfies the IOPS requirements requested by the user.

After the above process (S3500), the external connection configuration selection program 3530 obtains the port performance predicted value information 3656 and the pool capacity predicted value information 3645 (S3600).

Next, the external connection configuration selection program 3530 sets the priority for the path selected in the previous process (S3500) using the port performance predicted value information 3656 and the pool capacity predicted value information 3645 obtained in the previous process (S3600). Then, the priority is set for the logical volume or the pool within the external storage device included on the path with the highest priority from among each of the paths whose priority is set (S3700).

The following is an example of setting the priority of the path in the present embodiment. The priority is set in the order of the largest difference between the predicted value of the I/O performance (or, the predicted value of the average value) in the main time band of use of the data (the predetermined time band), which is a requirement for the logical volume, and the value of the IOPS (input/output processing performance), which is the I/O performance requirement for the logical volume. In other words, the path with the largest difference between the predicted value of the I/O performance (or, the predicted value of the average value) in the main time band of use of the data and the value of the IOPS performance for the logical volume is set to the highest priority.

The following is an example of the method of setting the priority of the logical volume or pool within the external storage device in the present embodiment. In this method, the pool with the largest predicted value of free capacity of the pools within the external storage device, or the logical volumes forming the pool are selected as the pool or logical volume with the highest priority. The arbitrary time for predicting the free capacity may be set in the requirements for the logical volume input by the user, or it may be determined by the external connection configuration program, or it may be determined by another method.

Next, the external connection configuration selection program 3530 transmits the host computer port identifier obtained in a previous process (S3000), the path with the highest priority selected in the previous process (S3700), the combination of pool or logical volume, and information on whether or not a logical volume needs to be created within the external storage device included in the path with the highest priority received in a previous process (S3400) to the external connection configuration setting program 3540 as the most suitable external connection configuration for the user's requirements, and this process terminates (S3800).

In the present embodiment, it has been stated that the path and the combination of pool and logical volume are sent to the external connection configuration setting program 3540, however, instead the selected external connection configuration may be submitted to the user, and the process terminated. Also, a plurality of high priority paths may be transmitted to the external connection configuration setting program 3540, or submitted to the user, and the present invention is not limited to the constitution shown in FIG. 16. Also, the path does not have to be automatically selected, but the path selected in S3500 may be displayed on the output device of the management computer, and selected by the user.

By setting the priority in this way, it is possible to provide the host computer with a higher IOPS performance and so on, from among the plurality of external connection configurations selected in S3500 (path setting and allocated logical volume), in accordance with the conditions of use of the host computer.

FIG. 17 is a diagram showing an example of the volume selection program 3552 process in the present embodiment.

The volume selection program 3552 receives the external storage device information and the requirements for the logical volume from the external connection configuration selection program 3530 (S4000).

The volume selection program 3552 obtains the logical volume configuration information 3615 (S4100).

Then, the volume selection program 3552 determines whether or not there is a logical volume within the external storage volume that satisfies the requirements of the user's request, using the logical volume configuration information 3615. In other words, the volume selection program 3552 determines whether or not there is a logical volume that satisfies the user's required performance received in S4000 within the external storage device received in S4000 (S4150).

In the present embodiment, of the user's required performance, it is determined whether or not there is a logical volume with a capacity larger than the capacity required by the user. However, the present embodiment is not limited to this. For example, if the user's requirement is for a storage device type, it is possible to determine whether the logical volume is formed from a storage device of the required type. Further, if the user requires a specific RAID level, it may be determined whether the logical volume has that RAID level.

When it is determined that there is a logical volume that satisfies the user's required performance (S4150: YES), the logical volume information and "no necessity to create a new logical volume (logical volume creation not needed)" as the answer to whether or not creation of a logical volume is necessary are transmitted to the external connection configuration selection program, and then the process is terminated (S4300). In the present embodiment, "logical volume information" means the LUN of the logical volume and configuration information of the storage device, and so on, but other information may also be used.

If the result of the determination is that there is no logical volume that satisfies the user's required performance (S4150: NO), the volume selection program 3552 obtains the volume pool capacity information 3640 (S4200).

Next, the volume selection program 3552 determines whether or not there is a pool that satisfies the capacity requirements within the storage device, using the volume pool capacity information 3640 (S4220). In the present embodiment, it is determined whether or not there is a pool with a capacity larger than the logical volume capacity required by the user. However, the present embodiment is not limited to this, for example, it may be determined whether or not the pool is in a storage device of a type that the user requires, or whether or not the pool has the RAID level required by the user.

When the result of the determination is that there is no such pool (S4220: NO), the message that it is not possible to allocate the logical volume is transmitted to the external connection configuration selection program, and then the process is terminated (S3530).

When the result of the determination is that there is a pool (S4220: YES), the pool information and "necessary to create a new logical volume (logical volume creation needed)" as the answer to whether or not creation of a logical volume is necessary are transmitted to the external connection configuration selection program, then the process is terminated (S4300). In the present embodiment, "pool information" is configuration information such as the pool identifier and the storage device name. However, the present embodiment is not limited to this.

Figure 18:
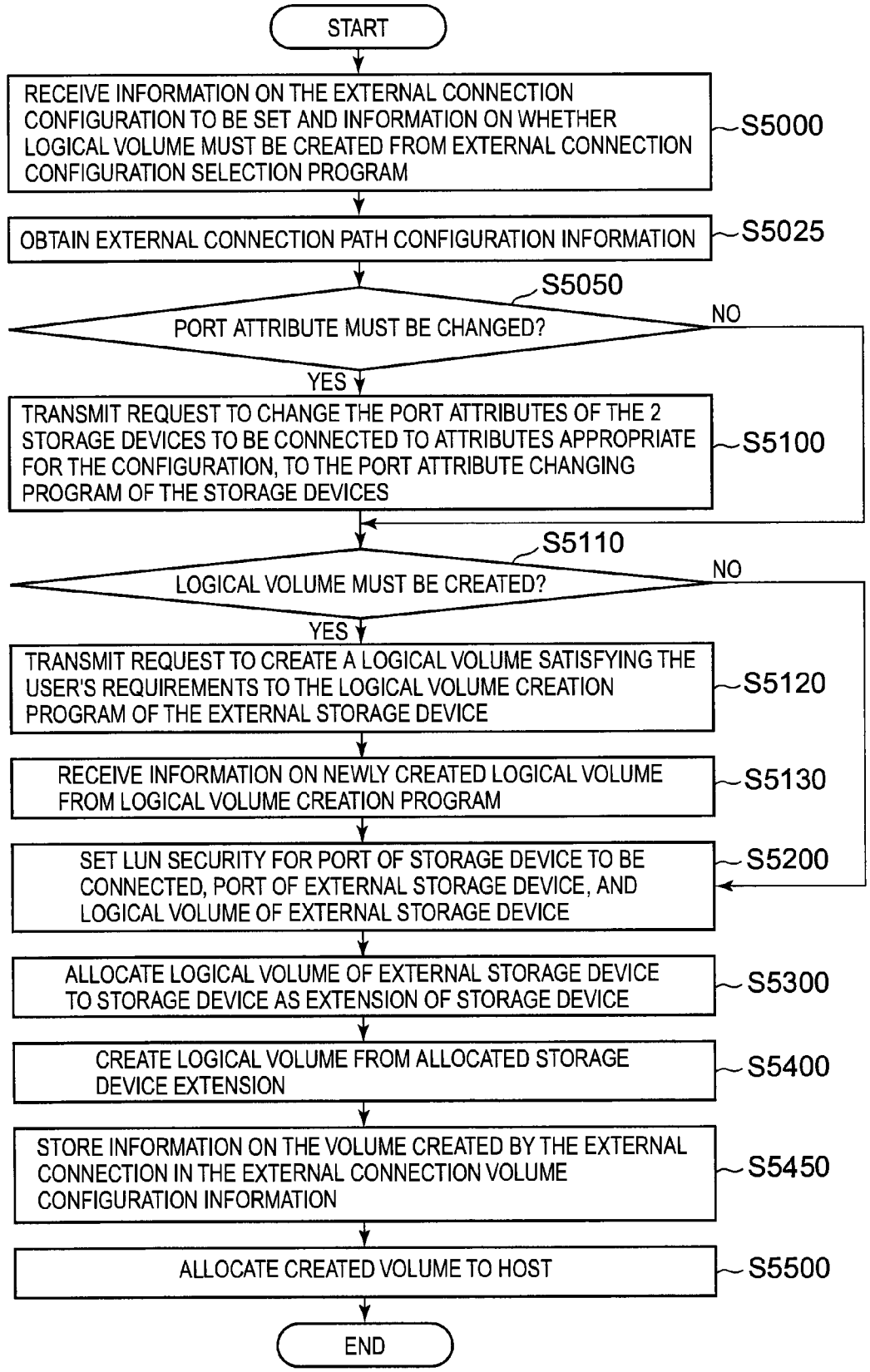
FIG. 18 is a diagram showing an example of the external connection configuration setting program process in the present embodiment.

FIG. 18 is a diagram showing an example of the external connection configuration setting program 3540 process in the present embodiment.

The external connection configuration setting program 3540 receives the set external connection configuration information and the information on whether or not the logical volume needs to be created from the external connection configuration selection program 3530 (S5000).

In the present embodiment, external connection configuration information includes the host computer port identifier, the storage device identifier, the identifier for the port to which the host computer is connected, which is a port in the storage device, the identifiers and attributes of the ports used in the external connection (primary port), the external storage device identifier and port (secondary port) identifier and attributes, the LUN of the logical volume or the ID of the pool within the external storage device.

However, the present embodiment is not limited to this, and other information may be included. Also, in the present embodiment, the case where the external setting configuration to be set is received from the external connection configuration selection program 3530 is described, but instead a format in which the user selects from among the external connection configuration information selected by the external connection configuration selection program 3530 may be used.

Next, the external connection configuration setting program 3540 obtains the external connection path configuration information 3660 (S5025).

Next, the external connection configuration setting program 3540 determines whether or not it is necessary to change the attributes of the ports included in the configuration when setting the external connection configuration received in a previous process (S5000) (S5050). Specifically, using the external connection path configuration information 3660 received in a previous process (S5025), it is determined whether or not the status of the combination of ports (combination of primary port and secondary port) of the external configuration is "attributes must be changed".

When the result of the determination at S5050 is that it is necessary to change the attributes of the port (S5050: YES), the external connection configuration setting program 3540 transmits a request to change the attribute of the primary port to initiator to the port attribute changing program 1425 of the storage device 1000 that has the primary port (S5100). Likewise, the external connection configuration setting program 3540 transmits a request to change the attribute of the secondary port to target to the port attribute changing program 4425 of the external storage device 4000 that has the secondary port (S5100). Then the process proceeds to the next step (S5110).

When the result of the determination at S5050 is that it is not necessary to change the attributes of the port (S5050: NO), the process proceeds to the next step (S5110).

Then it is determined whether or not it is necessary to create a logical volume from the information on whether or not the logical volume needs to be created obtained in S5000 (S5110).

When the result of the determination at S5110 is that it is necessary to create a logical volume (S5110: YES), a request is transmitted to the logical volume creation program 4450 of the external storage device obtained in S5000 to create a logical volume satisfying the capacity required by the user using the pool obtained in S5000 (S5120).

In the present embodiment, the logical volume creation program within the external storage device creates the logical volume. However, instead the management computer 3000 may have a logical volume creation program, and the logical volume may be created by this program, or another method may be used.

Next, the volume selection program 3552 receives the information on the newly created logical volume from the logical volume creation program 4450 (S5130). In the present embodiment, the information on the newly created logical volume includes the LUN of the logical volume and the storage device name, but information other than this may also be used. Then, the process proceeds to the next step (S5200).

When the result of the determination at S5110 is that it is not necessary to create a logical volume (S5110: NO), the process proceeds to the next step (S5200).

The external connection configuration setting program 3540 sets the use authorization, such as LUN security and the like, for the port of the storage device connected to the external storage device obtained in S5000, the port of the external storage device connected to the storage device, and the logical volume within the external storage device allocated to the virtual logical volume within the storage device (S5200), and proceeds to the next step (S5300).

Next, the external connection configuration setting program 3540 allocates the logical volume of the external storage device to the storage device, as an extension of the storage device (S5300). In this patent specification, when configuring an external connection, resources mapped to the storage device 1000 are referred to as extensions. In a configuration without an external connection, namely in a configuration in which hard disks within the storage device are used, an extension is the physical resource 1600 as shown in FIG. 2.

Next, using the extension of the storage device allocated in the previous process (S5300), the external connection configuration setting program 3540 creates a logical volume within the storage device (S5400). In other words, the logical volume of the storage device is a virtual volume, and does not directly have physical resources. The physical resources are in the logical volume of the external storage device allocated to the logical volume of the storage device.

Next, the external connection configuration setting program 3540 stores the information regarding the logical volume created by the external connection in the external connection volume configuration information 3620 (S5450).

Then, the external connection configuration setting program 3540 terminates this process, after allocating the logical volume created in a previous process (S5400) to the host (S5500). In the present embodiment, the volume is allocated to the host by setting the LUN security for the host port, the storage port, and the logical volume created in a previous process (S5400), similar to a previous process (S5200), but other methods may be used.

In S5300, the allocation size of the cache memory may be allocated to the extension of the storage device. Also, writing requests from the host for the logical volume created in S5400 may be executed by either a synchronous or asynchronous process of transferring to the volume of the external storage device allocated in S5300.

According to the first embodiment as described above, when the user sets the requirements for the capacity and I/O performance of a logical volume, a logical volume that satisfies these capacity requirements is selected or created. Then, a path that satisfies the user's I/O performance requirements is selected from among all the paths that could be used as an external connection to the logical volume. In this way, it is possible to select or create an external connection configuration that is the most suitable for the user's requirements.

Embodiment 2

In the second embodiment, a process for selecting and/or creating an external connection as requested by a user is carried out in a system configuration that is different from the first embodiment. In the first embodiment as described above, as shown in FIGS. 1 through 18, the storage device 1000 is a storage device that receives direct I/O from the host computer, and the external storage device 4000 is a storage device that receives I/O requests transferred from the storage device 1000. However, in the second embodiment as explained below, the system is configured so that the storage system 1000 has the function of an external storage device, and the external storage device 4000 has the function of a storage device.

Figure 19:
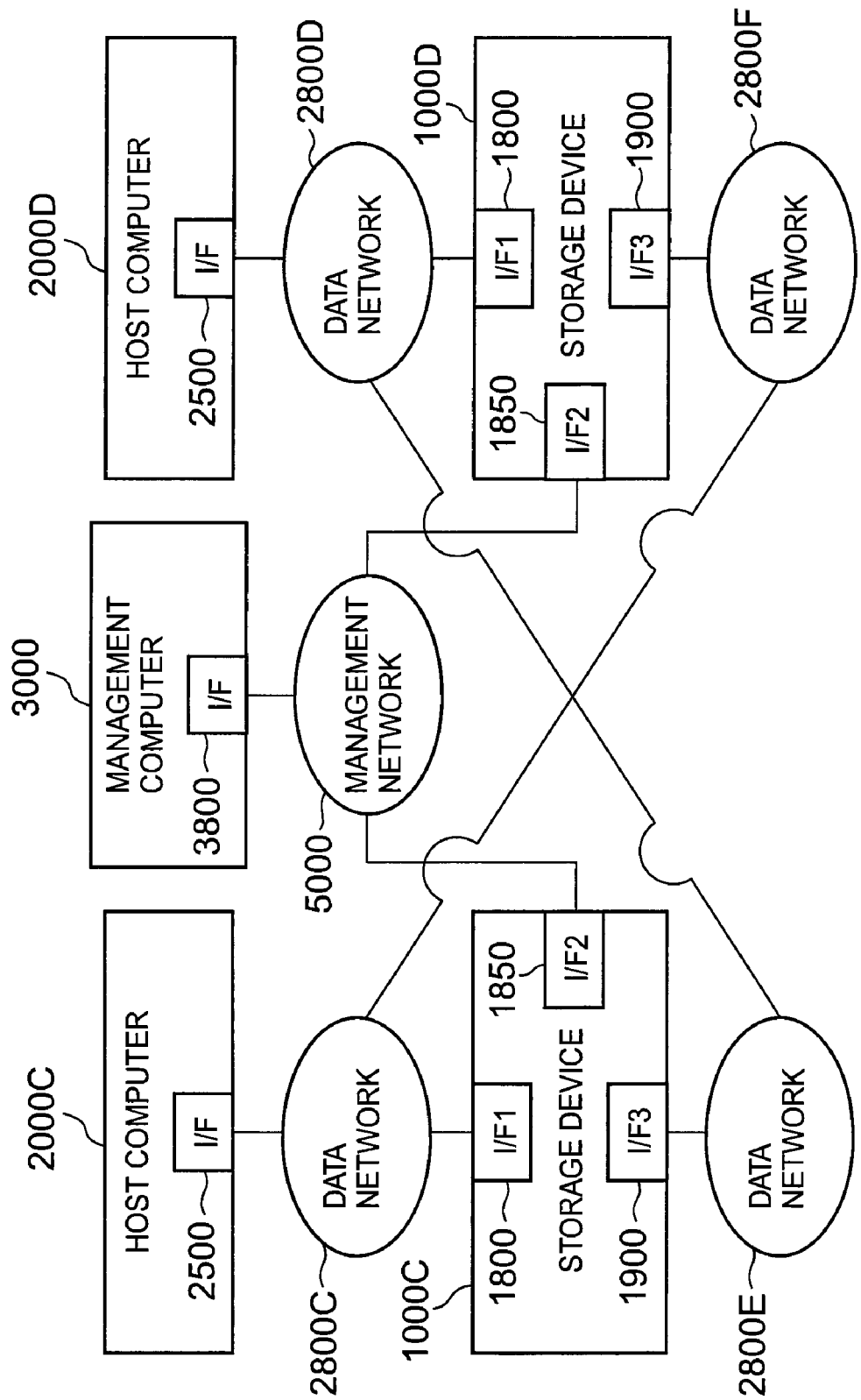
FIG. 19 is a block diagram showing the system configuration according to a second embodiment.

The following is an explanation of the second embodiment using FIG. 19. The majority of the system configuration of the present embodiment is the same as that of the first embodiment as described previously, so the explanation concentrates on the configuration that is different.

FIG. 19 is a block diagram showing the storage system configuration according to the second embodiment. In FIG. 19, a storage system 10000 and a storage system 1000D are mutually connected by a data network 2800.

In the system according to the present embodiment, the storage devices 1000 (1000C, 1000D) and a host computer 2000 (2000C, 2000D) are mutually connected via data networks 2800 (2800C, 2800D, 2800E, 2800F).

A management computer 3000 and the storage devices 1000C, 1000D are connected via a management network 5000. Also, in the present embodiment, the case where the management computer 3000 is directly connected to the storage devices 1000C and 1000D is shown. However, instead a configuration in which the management computer 3000 obtains information from the storage devices 1000C and 1000D via the host computers 2000C and 2000D may also be used.

Further, in the present embodiment, the case in which the data networks 2800C to F and the management network 5000 are each a separate network is shown. However, instead these networks may be configured to be the same network. Also, the management computer 3000 and the host computer 2000 may be the same computer.

The following is an explanation of the operation of the present embodiment. The operation of the present embodiment may be understood by changing the parts dealing with the external storage device 4000 into the storage device 1000 in the above explanation of the first embodiment.

What is claimed is:

1. A management computer that manages
a first storage device that includes a first physical resource that forms a first pool, a first controller that processes an input or output request from a host computer, and a plurality of first ports, and
a second storage device that includes a second physical resource that forms a second pool, a second controller, and a plurality of second ports that connect to the plurality of first ports of the first storage device,
the management computer comprising:
a memory for storing path configuration information that indicates a free capacity for input/output processing of a plurality of paths formed by the plurality of first ports and the plurality of second ports; and
a processor that executes a process based on the information stored in the memory,
the processor receiving mapping requests for mapping a second logical volume, to which the second physical resource within the second pool is allocated, to a first logical volume that the first controller provides to the host computer, and a path performance request for a path used when transmitting to the second storage device the input or output request to the first logical volume that the first controller has received from the host computer,
the processor selecting one or a plurality of paths having an input/output processing free capacity that satisfies a path performance requirement, from among the plurality of paths formed by the plurality of first ports and the plurality of second ports, based on the path configuration information read from the memory,
the processor setting priority for the selected one or a plurality of paths, and selecting a path based on the set priority,
the processor setting to the host computer use authorization for a primary port that forms the selected path and that is included in the plurality of first ports, a secondary port that forms the selected path and that is included in the plurality of second ports, and the second logical volume, and
the processor mapping the second volume to the first volume via the primary port and the secondary port.

2. The management computer according to claim 1, wherein the free capacity of input/output processing of the path formed by a port included in the plurality of first ports and a port included in the plurality of second ports is the smaller of the free capacity of input/output processing of the port included in the plurality of first ports, and the free capacity of input/output processing of the port included in the plurality of second ports.

3. The management computer according to claim 2, wherein
the memory stores port performance information indicating the maximum input/output processing capacity of each of the plurality of first ports, and the maximum input/output processing capacity of each of the plurality of second ports,
the processor receives an input/output processing amount of the plurality of first ports from the first storage device, and receives an input/output processing amount of the plurality of second ports from the second storage device,
the processor defines a difference between the free capacity of input/output processing of the port included in the plurality of first ports and the received input/output processing amount as the free capacity of input/output processing of the port included in the plurality of first ports, and
the processor defines a difference between the free capacity of input/output processing of the port included in the plurality of second ports and the received input/output processing amount as the free capacity of input/output processing of the port included in the plurality of second ports.

4. The management computer according to claim 3, wherein the path performance requests include the input/output processing amount sufficient for the processing on the path.

5. The management computer according to claim 4, wherein
the processor receives the mapping request, the path performance request, and further receives a predetermined time band, and
the processor, when setting the priority of the selected one or plurality of paths, sets a higher priority in order of the larger difference between the requested path performance and the predicted value of the input/output processing amount in the predetermined time band for the selected one or a plurality of paths.

6. The management computer according to claim 5, wherein the predetermined time band is a time band in which the host computer accesses the first volume.

7. The management computer according to claim 6, wherein
the port performance information stored in the memory further indicates the input/output processing amount in the predetermined time band in the past for each of the plurality of first ports, and the input/output processing amount in the predetermined time band in the past for each of the plurality of second ports, and
the processor refers to the port performance information read from the memory, and calculates the predicted value of the input/output processing amount in the predetermined time band for the selected one or a plurality of paths, based on the input/output processing amount in the predetermined time band in the past for the port included in the plurality of first ports that forms the selected one or a plurality of paths, and the input/output processing amount in the predetermined time band in the past for the port included in the plurality of second ports that forms the selected one or a plurality of paths.

8. The management computer according to claim 7, wherein
the processor further receives the mapping request, the path performance request, and the predetermined time band, as well as requirements to be satisfied by the second logical volume of the second storage device mapped to the first logical volume of the first storage device,
the processor selects one or a plurality of logical volumes that satisfy the requirements for the second logical volume, from among the plurality of logical volumes to which the second physical resource within the second pool is allocated, and
the processor sets the priority to the selected one or a plurality of logical volumes, and selects the second logical volume based on the set priority.

9. The management computer according to claim 8, wherein
the requirements for the second logical volume include at least one of the storage capacity, a type of physical resource to be allocated to the logical volume, and a RAID level formed by a physical resource allocated to the logical volume.

10. The management computer according to claim 9, wherein
when there is no logical volume that satisfies the requirements for the second logical volume from among the plurality of logical volumes to which the second physical resource within the second pool is allocated, the processor issues an instruction, to the second storage system, to allocate the second physical resource within the second pool and to create a logical volume that satisfies the requirements, and selects the logical volume created as a result of this instruction as the second logical volume.

11. The management computer according to claim 10, wherein the processor, when setting the priority to the selected one or a plurality of logical volumes, sets a higher priority in order of the larger of the predicted values of free capacity of the second pool to which the selected one or a plurality of logical volumes belongs.

12. The management computer according to claim 11, wherein
the memory further stores pool capacity information indicating the free capacity of the second pool at a certain time in the past,
the processor receives the second pool capacity from the second storage device, and stores the received free capacity and a reception time in the pool capacity information, and
the processor refers to the pool capacity information stored in the memory, and calculates the predicted value of free capacity of the second pool based on the past capacity of the second pool.

13. The management computer according to claim 11, wherein the processor sets a port attribute of the primary port as an initiator, and sets the port attribute of the secondary port as the target.

* * * * *